Nov. 7, 1967 H. F. WOLF ET AL 3,351,773
ELECTRONIC CIRCUIT FOR SIMULATING CERTAIN CHARACTERISTICS OF A BIOLOGICAL NEURON
Filed May 31, 1963
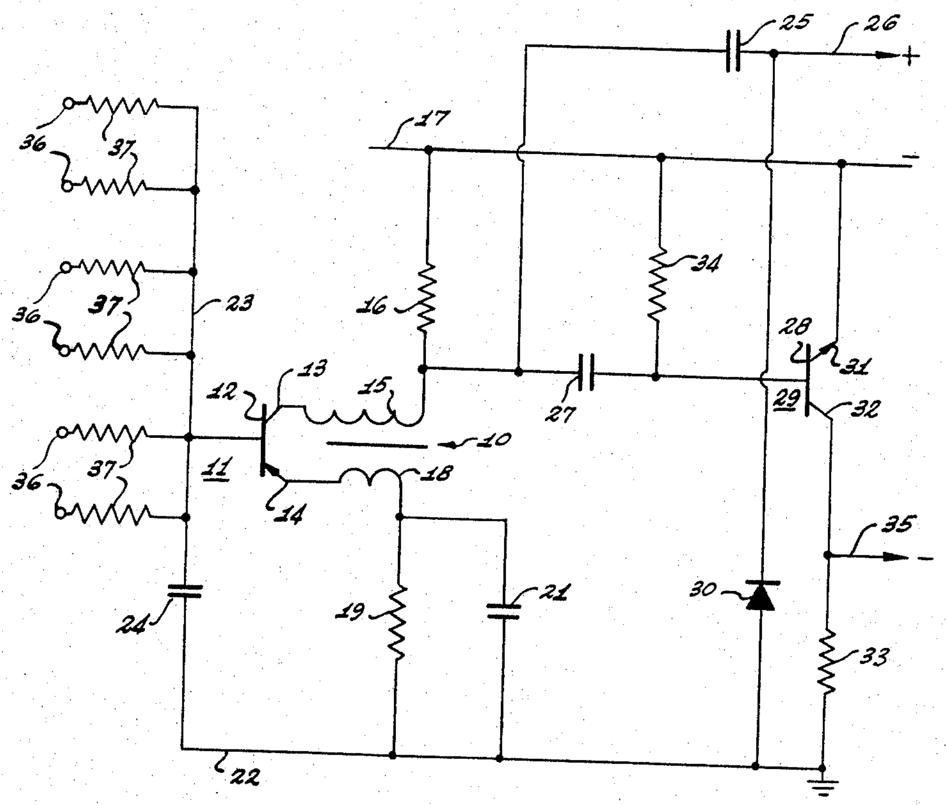
INVENTORS
HORST F. WOLF
VAUGHN W. GOLDSWORTHY
BY Fulwider, Patton, Rieber, Lee, and Utecht
ATTORNEYS United States Patent Office 3,351,773
Patented Nov. 7, 1967

3,351,773
ELECTRONIC CIRCUIT FOR SIMULATING CERTAIN CHARACTERISTICS OF A BIOLOGICAL NEURON

Horst F. Wolf, Costa Mesa, and Vaughn W. Goldsworthy, Tustin, Calif., assignors to McDonnell Douglas Corporation, Santa Monica, Calif., a corporation of Maryland
Filed May 31, 1963, Ser. No. 284,645
7 Claims. (Cl. 307—88.5)

The present invention relates generally to electronic neurons, and more particularly to a high-speed electronic neuron including many of the properties of a biological neuron. Such electronic neurons, while of general application, are particularly adapted for use in parallel logic data processing systems which are modeled after the neural network structures found in animals and man.

The properties of biological neurons which are simulated in the artificial electronic neuron of the present invention may be broadly described as follows:

(a) *Standard signal shape.*—The output signal generated by a neuron is a train of electrical pulses. The exact time sequence of these pulses is a function of the input signal. The shape, duration, and amplitude of the individual pulse, however, are independent of the input signal.

(b) *Threshold phenomenon.*—A neuron will only produce an output signal if the summation of its excitatory input signals exceeds a certain threshold level. Excitatory input signals are those that tend to fire the neuron (generate an output pulse).

(c) *Refractory recovery.*—Immediately after firing, there is a recovery period during which the neuron exhibits reduced sensitivity to input stimulation. This period is called the refractory period. The reduced sensitivity is explained by an increase in threshold level during the firing. After firing, the threshold level falls back exponentially to the normal state.

(d) *Signal delay and temporal summation.*—A neuron exhibits a time delay between excitation and firing. The delay is an exponential function of the excitation amplitude: higher input levels are associated with shorter delays. Temporal summation can be described as follows: an excitatory input pulse that does not reach the firing threshold cannot cause a neuron firing, but it will condition the neuron to be more sensitive to a subsequent pulse by effectively lowering the threshold potential. The conditioning effect dies out exponentially with time.

(e) *Inhibitory input signals.*—Inhibitory input signals are signals that tend to restrain a neuron from generating an output. They may be treated as excitatory signals with a negative prefix.

(f) *Repetitive firing.*—A constant stimulus above the threshold causes the neuron to generate a train of pulses. The pulse repetition rate is a function of the input amplitude; it increases as the input signal level goes up.

The above list of properties is neither complete nor valid for all classes of biological neurons. The artificial electronic neuron exhibiting these characteristics is particularly useful in networks of data processing systems.

The speed of response and duration of the output signal of biological neurons are roughly on the order of milliseconds. In data handling networks, the artificial electronic neuron action need not be confined to this range of speed, but much higher speeds are possible and the electronic neuron according to the present invention provides speeds in the microsecond range with simple and inexpensive circuitry.

It is an object of the present invention to provide an improved artificial electronic neuron which incorporates many of the properties of a biological neuron.

Another object of the invention is the provision of an improved electronic neuron which is simple and inexpensive and operates at high speed.

A further object of this invention is the provision of an improved electronic neuron simulating those properties of a bioluogical neuron particularly desirable for use in network structures for data processing systems.

A still further object of this invention is the provision of an electronic neuron of simple and inexpensive form and high-speed operation and simulating certain of the properties of a biological neuron which are desirable in artificial network structures modeled after the neural network structures found in animals and men.

These and other objects and features of the invention will be readily apparent to those skilled in the art from the following specification and the appended drawing, in which:

The figure shows a diagrammatic representation of an electronic neuron according to the present invention.

In the specific form selected for illustration in the drawing, the electronic neuron of the present invention employs a regenerative element in the form of a blocking oscillator which generates a standard output pulse independent of the input signal once the input amplitude has reached a threshold level. This blocking oscillator includes a transistor 11, specifically shown as PNP type, having a base 12, a collector 13 and an emitter 14. The collector 13 is connected through one winding 15 of a pulse transformer 10 and a load resistor 16 to one side of a D-C supply, indicated by line 17. The emitter 14 is connected through the other winding 18 of the transformer 10 and a parallel R-C circuit made up of resistor 19 and capacitor 21 to the other side of the D-C supply, represented by a ground line 22. An input line 23 is connected to the base 12 and through a delay and summation capacitor 24 to the line 22.

The output of the blocking oscillator is connected directly through capacitor 25 to an inhibitory output line 26. The output side of the capacitor 25 is connected reversely through diode 30 to ground line 22 to maintain the line 26 at ground potential when transistor 11 is not conducting. The output of the blocking oscillator thereby appears at line 26 as an inhibitory pulse positive with respect to ground.

The output of the blocking oscillator is also coupled through a capacitor 27 to the base 28 of an inverting transistor 29, shown as of NPN type, having an emitter 31 connected to line 17 and a collector 32 connected to the ground line 22 through a load resistor 33. A biasing resistor 34 is connected between the base 28 and emitter 31 of the transistor 29. The excitatory output of the neuron is shown at line 35 producing, in the circuit shown, an excitatory pulse negative with respect to ground.

The input line 23 is connected to any desired number of input terminals 36 through individual input limiting resistors 37.

The operation of the electronic neuron according to the present invention in simulating the characteristics of a biological neuron previously discussed will now be described.

The blocking oscillator circuit selected for the neuron specifically illustrated employs collector to emitter feedback through transformer 10 to achieve high input impedance down to direct current with a minimum of components.

The rise time, fall time, amplitude and duration of the output pulse of the blocking oscillator are determined by the characteristics of the transistor and the transformer and are independent of the input signal once the input amplitude (negative in the circuit shown) reaches a threshold level. The time sequence of the pulses, however, is controlled by the value of the input signal. The neuron output for a continuous input signal is a train of electrical pulses of standard shape and having a time sequence determined by the value of the input signal.

The refractory recovery period characteristic is simulated by the parallel R-C combination 19, 21 in circuit with the emitter 14 of the blocking oscillator transistor 11. During the conducting interval of transistor 11, capacitor 21 is charged to a negative voltage to provide the emitter 14, immediately it ceases conducting, with a negative potentional which effectively increases the threshold level of the oscillator. The charge dissipates through resistor 19 at a rate determined by the components' values.

The characteristics of signal delay and temporal summation are introduced into the electronic neuron by the integrating circuit including the input resistors 37 and capacitor 24. The time constant for the signal delay is determined by the charging of capacitor 24 through an input resistor 37 and can be readily changed by varying the value of the input resistance. For more than one input, the combined time constant will be lowered depending on the source impedances and the values of the other input resistors.

This integrating circuit has a temporal summation capability in that a sequence of pulses below the threshold level, which would not individually be able to trigger the oscillator, can, in combination, charge capacitor 24 sufficiently to cause regenerative action if they follow each other sufficiently closely in time.

The effective summation of any number of separate inputs 36 is achieved through the feeding of capacitor 24 therefrom through a like number of input resistors 37. This effectively adds the input signals at the base 12 of the oscillator transistor 11.

It is obvious that the input signals must be of proper polarity to initiate an output from the oscillator transistor 11. In the circuitry illustrated, excitatory input signals will be negative, and therefore inhibitory input signals, which operate to restrain the oscillator and the neuron from producing an output, will be of opposite polarity —that is, positive—in the specific circuit of the drawing.

The repetitive firing characteristic is obviously present in the neuron of the present invention, since a constant input above the threshold value will cause the oscillator to generate a train of pulses whose repetition rate is a function of the input amplitude and increases as the input amplitude increases (negatively in the circuit shown).

The inhibitory output signal is taken from collector 13 of the blocking oscillator through capacitor 25 to inhibitory output line 26. The diode 30 connects ground line 22 (positive) to the output side of capacitor 25 and the size of the capacitor and the speed of oscillation are such as to maintain the output line 26 substantially at ground potentional when transistor 11 is not conducting. When transistor 11 conducts, collector 13 becomes less negative and the collector side of capacitor 25 follows to increase the potential at the output side so that the oscillator output appears on line 26 as an inhibitory output pulse positive with respect to ground potential.

To use the output of the blocking oscillator as an excitatory input signal for following neuron circuits, it has to be inverted to an increasingly negative pulse, and this is accomplished by transistor 29 whose base 28 is coupled through capacitor 27 to the output of the blocking oscillator. The excitatory output of the electronic neuron of this invention is then taken across resistor 33 and appears as a negative pulse at line 35.

By way of example only, and without limitation on the scope of the invention, the following values of components illustrate one manner only in which an electronic neuron according to the invention may be constructed:

| | |
|---|---|
| Transistor **11** | 2N2401 |
| Transistor **29** | 2N1306 |
| Diode **30** | 1N270 |
| Transformer **10** | (1) |
| Resistances: | |
| **16** ohms | 100 |
| **19** do | 27 |
| **33** do | 100 |
| **34** do | 5100 |
| **37** do | 1000 |
| Capacitors: | |
| **21** microfarads | 0.02 |
| **24** picofarads | 680 |
| **25** microfarads | 0.01 |
| **27** picofarads | 180 |
| Voltage | |
| **17–22** volts | −10 |

[1] Turns ratio 15, 18=20 : 10.

It is therefore seen that the electronic neuron according to the present invention simulates many of the properties and characteristics of natural biological neurons in a very simple and inexpensive circuit which, in addition, has a capability of operating at speeds much higher than the speed of natural neurons, and while a certain preferred embodiment of the invention has been selected for specific illustration and description herein, it is understood that the invention is not limited thereto as many variations will be apparent to those skilled in the art, and the invention is to be given its broadest interpretation within the terms of the following claims.

We claim:

1. An electronic circuit for simulating certain of the characteristics of a biological neuron comprising: a blocking oscillator having a feedback circuit whereby said oscillator generates a series of pulses whose amplitude is independent of the value of the input signal to the oscillator but the frequency of which is controlled by the input amplitude, said oscillator having a minimum input threshold below which it will not conduct; input means to said oscillator including a series resistor and a capacitor connected to a point between said resistor and oscillator to provide both an input delay period and temporal summation of a succession of inputs individually below said threshold; an inhibitory output for said circuit connected to said oscillator output through a series capacitor; and a diode connecting the output side of said capacitor to ground so as to maintain said inhibitory output normally at ground potential and to add thereto the output of the oscillator to produce a positive inhibitory output pulse.

2. An electronic neuron comprising: a blocking oscillator including a transistor having a feedback circuit for generating a plurality of output pulses whose amplitude is independent of the value of the input signal once the input signal is above a minimum threshold value and whose frequency is dependent upon the value of the input signal; an input circuit to said transistor including a series resistor and a capacitor connected to a point between said resistor and transistor to delay the signal to the transistor and to effect a summation of input signals individually below said threshold value; a parallel capacitor-resistance circuit connected for charging of the capacitor when the transistor conducts to increase the threshold value when the transistor ceases conducting so as to simulate a refractory delay period; an inhibitory output from said transistor providing a positive inhibitory pulse; and a second transistor coupled to the output of said first transistor for inverting the output pulse therefrom, said second transistor providing a negative excitatory pulse output for the neuron.

3. The electronic neuron defined in claim 2 in which said inhibitory output is fed from the blocking oscillator through a series capacitor and in which the output side of the capactior is connected through a diode to ground to maintain the inhibitory output normally at ground potential and to add thereto a pulse from the blocking oscillator as a positive pulse above ground potential.

4. An electronic neuron comprising: a blocking oscillator including a transistor; means coupling the collector and emitter circuits of said transistor to provide a feedback to the transistor whereby the transistor generates a plurality of pulses whose amplitude is independent of the value of the input signal after it is above a minimum threshold value and whose frequency is determined by the amplitude of the input signal; a parallel resistor-capacitor circuit connected in the emitter circuit of said transistor to charge the capacitor while the transistor conducts to apply a charge to the emitter at the termination of the conduction period so as to increase said threshold value at which the transistor conducts, said charge being dissipated through said resistor in accordance with the values of the resistor-capacitor combination; on input circuit connected to the base of said transistor and including a series resistor; a capacitor connected between the emitter and a point between said resistor and base, said last-mentioned capacitor inserting an input delay period upon the appearance of an input signal and also effecting a summation of a sequence of input signals which are individually below said threshold value; and an inhibitory output circuit connected to said transistor collector to supply a positive inhibitory pulse.

5. An electronic neuron comprising: a blocking oscillator including a transistor; means coupling the collector and emitter circuits of said transistor to provide a feedback to the transistor whereby the transistor generates a plurality of pulses whose amplitude is independent of the value of the input signal after it is above a minimum threshold value and whose frequency is determined by the amplitude of the input signal; a parallel resistor-capacitor circuit connected in the emitter circuit of said transistor to charge the capacitor while the transistor conducts to apply a charge to the emitter at the termination of the conduction period so as to increase said threshold value at which the transistor conducts, said charge being dissipated through said resistor in accordance with the values of the resistor-capacitor combination; an input circuit connected to the base of said transistor and including a series resistor; a capacitor connected between the emitter and a point between said resistor and base, said last-mentioned capacitor inserting an input delay period upon the appearance of an input signal and also effecting summation of a sequence of input signals which are individually below said threshold value; an inhibitory output circuit connected to said transistor collector through a series capacitor; and a diode connected between the output side of said series capacitor and the emitter side of the source whereby said inhibitory output is normally maintained at the value of the emitter supply and the transistor output is added thereto as a positive pulse.

6. An electronic neuron comprising: a blocking oscillator including a transistor; means coupling the collector and emitter circuits of said transistor to provide a feedback to the transistor whereby the transistor generates a plurality of pulses whose amplitude is independent of the value of the input signal after it is above a minimum threshold value and whose frequency is determined by the amplitude of the input signal; a parallel resistor-capacitor circuit connected in the emitter circuit of said transistor to charge the capacitor while the transistor conducts to apply a charge to the emitter at the termination of the conduction period so as to increase said threshold value at which the transistor conducts, said charge being dissipated through said resistor in accordance with the values of the resistor-capacitor combination; an input circuit connected to the base of said transistor and including a series resistor; a capacitor connected between the emitter and a point between said resistor and base, said last-mentioned capacitor inserting an input delay period upon the appearance of an input signal and also effecting summation of a sequence of input signals which are individually below said threshold value; an inhibitory output from said transistor collector supplying a positive inhibitory pulse; and a second, inverting transistor coupled to the output of said first transistor and operating to invert the output pulse thereof so as to supply an excitatory output pulse negative with respect to the emitter supply.

7. An electronic neuron comprising: a blocking oscillator including a transistor; means coupling the collector and emitter circuits of said transistor to provide a feedback to the transistor whereby the transistor generates a plurality of pulses whose amplitude is independent of the value of the input signal after it is above a minimum threshold value and whose frequency is determined by the amplitude of the input signal; a parallel resistor-capacitor circuit connected in the emitter circuit of said transistor to charge the capacitor while the transistor conducts to apply a charge to the emitter at the termination of the conduction period so as to increase said threshold value at which the transistor conducts, said charge being dissipated through said resistor in accordance with the values of the resistor-capacitor combination; a plurality of individual input circuits connected to the base of said transistor through individual series resistors; a capacitor connected between the emitter and a point between said resistors and base, said last-mentioned capacitor inserting an input delay period upon the appearance of an input signal and also effecting summation of a plurality of input signals which are individually below said threshold value; an inhibitory output circuit connected to said transistor collector through a series capacitor; a diode connected between the output side of said series capacitor and the emitter side of the source whereby said inhibitory output is normally maintained at the value of the emitter supply and the blocking oscillator output is added thereto as a positive pulse; and a second, inverting transistor coupled to the output of said first transistor and operating to invert the output pulse thereof so as to supply an excitatory output pulse negative with respect to the emitter supply.

References Cited

UNITED STATES PATENTS

| | | | |
|---|---|---|---|
| 2,906,893 | 9/1959 | Mattson | 307—88.5 |
| 2,950,398 | 8/1960 | Johnson | 307—88.5 |
| 2,964,708 | 12/1960 | Steele | 307—88.5 X |
| 3,075,085 | 1/1963 | Helbig et al. | 307—88.5 |
| 3,097,349 | 7/1963 | Putzrath et al. | 340—172.5 |
| 3,165,644 | 1/1965 | Clapper | 307—88.5 |

OTHER REFERENCES

"Artificial Neuron" in Science, vol. 129, Apr. 10, 1959, pp. 962–963.

"Electronic Neurons" in Electronic Design, Sept. 14, 1960, p. 40.

"Electronics & Biology" by T. Vaski in Electronics World, February 1962, pp. 27–30 and FIG. 7.

ARTHUR GAUSS, *Primary Examiner.*

S. D. MILLER, Jr., *Examiner.*